United States Patent
Bell et al.

(10) Patent No.: US 10,408,548 B2
(45) Date of Patent: Sep. 10, 2019

(54) FLAMELESS GLYCOL HEATER

(71) Applicant: ConleyMax, Inc., Calgary (CA)

(72) Inventors: Patrick G. Bell, Calgary (CA); William N. Beckie, Calgary (CA)

(73) Assignee: ConleyMax Inc., Calgary, Alberta (CA)

( * ) Notice: Subject to any disclaimer, the term of this patent is extended or adjusted under 35 U.S.C. 154(b) by 628 days.

(21) Appl. No.: 14/037,123

(22) Filed: Sep. 25, 2013

(65) Prior Publication Data

US 2015/0086933 A1 Mar. 26, 2015

(51) Int. Cl.
*F24H 9/00* (2006.01)
*F28D 21/00* (2006.01)

(52) U.S. Cl.
CPC .................. *F28D 21/001* (2013.01)

(58) Field of Classification Search
CPC ....................................... F24H 9/00
USPC ............. 432/29, 219; 122/26; 126/247; 237/12.3 B, 12.3 R
See application file for complete search history.

(56) References Cited

U.S. PATENT DOCUMENTS

| | | | |
|---|---|---|---|
| 3,231,016 A * | 1/1966 | Stewart | F01N 3/043 122/7 R |
| 4,264,826 A | 4/1981 | Ullmann | |
| 4,680,975 A | 7/1987 | Dodt | |
| 4,881,495 A | 11/1989 | Tornare et al. | |
| 5,098,036 A | 3/1992 | Brigham et al. | |
| 5,190,249 A | 3/1993 | Whitmire et al. | |
| 5,222,696 A | 6/1993 | Brigham et al. | |
| 5,709,201 A | 1/1998 | Puett, Jr. | |
| 6,761,135 B1 | 7/2004 | Becktold | |
| 6,883,467 B2 | 4/2005 | Holden | |
| 7,337,828 B2 * | 3/2008 | Lange | F28D 15/0241 122/31.1 |
| 7,424,916 B2 | 9/2008 | Foster et al. | |
| 7,614,367 B1 | 11/2009 | Frick | |
| 7,637,232 B2 | 12/2009 | Foster | |
| 7,766,077 B2 | 8/2010 | Masters et al. | |
| 7,866,380 B2 | 1/2011 | Masters et al. | |
| 8,291,868 B2 | 10/2012 | Whallon | |
| 8,469,283 B2 | 6/2013 | Sanger et al. | |
| 8,484,963 B2 | 7/2013 | Jackson et al. | |

(Continued)

FOREIGN PATENT DOCUMENTS

| | | |
|---|---|---|
| CA | 2741507 A1 | 9/2012 |
| CA | 2811829 A1 | 7/2014 |
| JP | 10-175419 A | 6/1998 |

OTHER PUBLICATIONS

Written Opinion of the International Searching Authority International Application No. PCT/CA2014/050919 dated Dec. 9, 2014 with Form PCT/ISA/237. (5 pages).

(Continued)

*Primary Examiner* — Steven B McAllister
*Assistant Examiner* — John E Bargero

(57) ABSTRACT

A fluid heating process which does not utilize an open flame, heat is created by a rotating prime mover(s) driving a hydraulic heat generator. Heat is also collected from the prime mover cooling system, and any exhaust heat generated by the prime mover. The heat energy is collected from all these sources, and transmitted through heat exchangers to generate a hot fluid, which can be used to heat other fluids and used for any application where heat is required.

16 Claims, 1 Drawing Sheet

(56) References Cited

U.S. PATENT DOCUMENTS

| | | | |
|---|---|---|---|
| 9,228,760 B2 | 1/2016 | Welle et al. | |
| 2003/0049139 A1* | 3/2003 | Coney | F02B 33/34 |
| | | | 417/243 |
| 2004/0144200 A1 | 7/2004 | Giordano et al. | |
| 2005/0121532 A1 | 6/2005 | Reale et al. | |
| 2006/0185621 A1 | 8/2006 | Foster et al. | |
| 2006/0260788 A1 | 11/2006 | Masters et al. | |
| 2007/0261823 A1 | 11/2007 | Masters et al. | |
| 2008/0185453 A1 | 8/2008 | Sanger et al. | |
| 2010/0139577 A1 | 6/2010 | Whallon | |
| 2010/0192875 A1 | 8/2010 | Frick | |
| 2011/0005757 A1 | 1/2011 | Hebert | |
| 2011/0079561 A1 | 4/2011 | Masters et al. | |
| 2011/0120427 A1 | 5/2011 | Andersson | |
| 2011/0185713 A1 | 8/2011 | Koopmann et al. | |
| 2011/0297353 A1 | 12/2011 | Stegeman | |
| 2012/0048717 A1 | 3/2012 | Frick | |
| 2012/0174987 A1 | 7/2012 | Crawford | |
| 2013/0270352 A1 | 10/2013 | Roth et al. | |
| 2014/0174691 A1 | 6/2014 | Kamps et al. | |

OTHER PUBLICATIONS

International Search Report dated Dec. 9, 2014, issued in International Application No. PCT/CA/2014/050919. (3 pages).
Canadian Office Action dated Aug. 19, 2013, issued in related Canadian Patent Application No. 2,815,986 (2 pages).
Canadian Office Action dated Jan. 23, 2014, issued in corresponding Canadian Patent Application No. 2,828,522 (2 pages).
International Preliminary Report on Patentability (Form PCT/IB/373) issued in International Application No. PCT/CA2014/050285 dated Sep. 15, 2015, with Form PCT/ISA/237 (6 pages).
Non-Final Office Action dated Mar. 25, 2016, issued in U.S. Appl. No. 13/835,617, (11 pages).
Notification of Transmittal of Translation of the International Preliminary Amendment Report on Patentability (Forms PCT/IB/326) of International Application No. PCT/CA2014/050919, dated Mar. 29, 2016 with Form PCT/IB/237 and PCT/IB/373. (7 pages).
Office Action dated Jun. 23, 2015, issued in U.S. Appl. No. 13/835,617 (13 pages).
International Search Report of PCT/CA2014/050286, dated Jun. 9, 2014 (Issued in related U.S. Appl. No. 13/835,617).
Written Opinion dated Jun. 9, 2014, issued in corresponding International Application No. PCT/CA2014/050286 (Issued in related U.S. Appl. No. 13/835,617).
Office Action dated Aug. 13, 2014, issued in related Canadian Patent Application No. 2815986 (2 pages).
U.S. Non-Final Office Action dated Oct. 7, 2014, issued in U.S. Appl. No. 13/835,617 (23 pages).
Office Action dated Feb. 26, 2015, issued in corresponding Canadian Application No. 2,828,522. (3 pages).
Extended Search Report dated Nov. 4, 2016, issued in counterpart to European Application No. 14762281.5 (8 pages).
Non-Final Office Action dated Oct. 20, 2016, issued in U.S. Appl. No. 13/835,617 (30 pages).
USPTO Office Action for U.S. Appl. No. 13/834,942 dated Jan. 11, 2017.
USPTO Office Action for U.S. Appl. No. 13/835,617 dated Jan. 10, 2018.
USPTO Office Action for U.S. Appl. No. 13/834,942 dated Sep. 20, 2017.

* cited by examiner

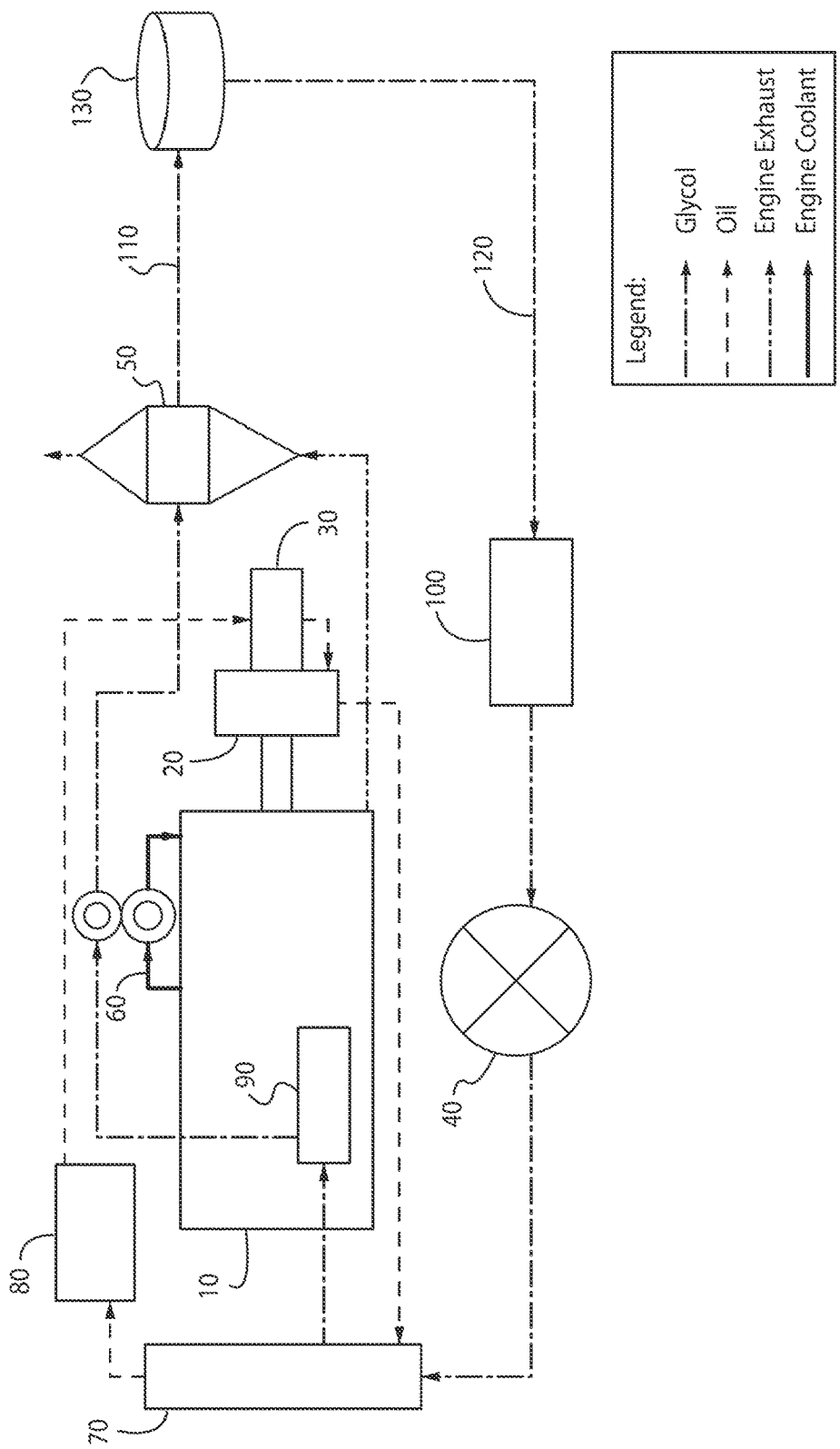

FLAMELESS GLYCOL HEATER

BACKGROUND

This invention generally relates to processes used to heat and pump industrial fluids, where the heating process does not require an open flame.

Certain industrial applications require large volumes of heated fluid, such as water, glycol, hydrocarbons or caustic solutions. Although the present application is not limited to any one of these fluids, this application will refer to glycol as the heated fluid. Also, although many types of fluids, such as glycol and oil, may be used as a hydraulic heat generator fluid, this application will refer to oil as the heating fluid.

Specific environments may require that an open flame not be present. This commonly occurs in the energy industry. This fluid heating system and process described herein was created to heat fluids in these environments.

Common practice has been to truck water to several tanks located at an oil or gas well location. The water is heated by open flamed trucks which utilize diesel or propane fired burners. However, these burners are energy inefficient (e.g., utilizing excessive amounts of fuel) and hazardous (e.g., causing fires, severe burns, and fatalities).

A flameless heating system removes these hazards by supplying hot glycol (e.g., temperature less than 100 degrees Celsius). There is no risk of explosion or burns due to open flames or high temperature steam. With the flameless heating system, once the tanks are filled, the heater is moved to the tank site, and heats the water, or any other fluid contained in the tanks, to a desired temperature. The heater generates hot glycol, which is pumped to the tanks The tanks are equipped with a steam tube or similar heat exchanger that allows the hot glycol to transfer heat to the fluid in the tank. Multiple tanks can be heated, for example, by connecting them in series with hoses and quick connect couplers or with the use of a manifold and connected in parallel. The heating process is efficient and safe, making the best use of fuel in a flameless environment.

SUMMARY

One aspect of the present invention consists of a number of components connected in such a way that the process provides efficient and flameless heat. The components are generally trailer mounted, but may also be truck or skid mounted.

The largest component is a prime mover. The prime mover is most often a diesel engine; however, gasoline or natural gas engines, or an electric drive may also be used depending on the environmental considerations. Connected directly to a drive shaft of the prime mover is a hydraulic heat generator. This component utilizes a majority of power available from the prime mover, and converts this energy into heat. The hydraulic heat generator can either be built as one or more components. It consists of a hydraulic pump to provide pressure and flow for the heat generator.

The heat generator can be attached to the hydraulic pump or standalone and connected via a hydraulic hose. The heat generator provides heat, for example, by shearing oil. One way this is accomplished is by pumping the oil at high pressure and volume and forcing it through different sizes of orifices. This heat is transferred to the glycol through a liquid to liquid heat exchanger.

Also driven by the prime mover is the main pump to move the glycol through the system. This pump, for example, is typically a centrifugal pump, and allows movement of glycol through the heating unit, out to wherever it is needed by using hoses and is returned back to the heating unit. This is a closed loop system, so there is no contamination or loss of the glycol.

The remaining major components to the system are heat exchangers.

A first heat exchanger, for example, is a liquid-to-liquid heat exchanger, mentioned above, that transfers heat from the oil, generated by the hydraulic heat generator, to the glycol.

A second heat exchanger, for example, is also a liquid-to-liquid heat exchanger, which transfers heat generated in the engine coolant to the glycol. This fluid is pumped by the main pump, as mentioned above.

A third heat exchanger, for example, is an air-to-liquid heat exchanger, (e.g., an intercooler) which transfers heat generated in the turbocharger compressor of the prime mover to the glycol.

A fourth heat exchanger, for example, is also an air-to-liquid heat exchanger, which transfers the heat generated in the engine exhaust to the glycol.

Other system components include, for example, a fuel tank to operate the engine, glycol and oil reservoirs, a trailer to house the components, and a control system to maintain operation of the system and alarm in the event of a mechanical failure.

The closed loop glycol heating process of the present invention has a capability of approximately 1.2M Btu.

BRIEF DESCRIPTION OF THE DRAWING

The following drawing illustrates an example of various components of the invention disclosed herein, and is for illustrative purposes only.

FIG. 1 is a schematic of one embodiment of a flameless glycol heater.

DETAILED DESCRIPTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Reference will now be made to FIG. 1, a more detailed description of the flameless heat generation process. Each component will be described in detail, followed by an overview of the heat generation process.

The largest component of the flameless process, for example, is prime mover 10. The prime mover 10 can be any type of engine, fueled by a variety of fuels such as diesel, propane or natural gas. It can be electrical in certain applications. The fuel driven engines, for example, are typically set up like a marine engine, which will have a liquid cooled intercooler to cool and increase the density of the air travelling from the compressor side of the turbocharger to the engine intake. It will also have a liquid/engine coolant heat exchanger to keep the engine running within its ideal temperature range. For the purpose of this application the liquid used is glycol.

Attached to the prime mover 10 are heat generator 20 and hydraulic pump 30. Oil is pumped by the hydraulic pump 30 through the heat generator 20. In the heat generator 20 the oil is sheared under high pressure and volume by pumping it through orifices of different sizes. As stated previously, this hydraulic heat generator can be a combined unit or separate components. Between the engine 10 and hydraulic heat generator, for example, is a torsional vibration dampener (not shown), which is used to smooth out vibrations created by the prime mover 10. The use of the torsional vibration dampener, for example, extends the life of the output shaft and the hydraulic heat generator.

Centrifugal pump 40 (e.g., glycol pump) is configured to pump glycol to the various components within the flameless heater and to wherever the hot glycol is needed. This is a closed loop system, where the glycol is continually circulated within the system.

Exhaust heat exchanger 50, in communication with the prime mover 10, is constructed, for example, of stainless steel or similar non corrosive material. In this example, the exhaust of the prime mover 10 enters the bottom of the heat exchanger 50, where it is directed upward to heat tube bundles containing glycol. Typically the exhaust gases enter the exhaust heat exchanger 50 at temperatures of up to 700 F (400 C) and exit the exhaust heat exchanger 50 at 70 F (25 C).

In this example, glycol is pumped through engine coolant/glycol heat exchanger 60 in order to keep the engine coolant within the appropriate operating range of the engine. This heat exchanger 60 is constructed, for example, of marine grade material.

In this example, heat exchanger 70 is configured to transfer heat from the oil to the glycol. Heat exchanger 70 is constructed, for example, of marine grade material.

In this example, reservoir tank 80 (e.g., oil reservoir) is configured to hold the oil. Reservoir tank 80 is typically 50 gallons (200 liters) in size and has an attached filter for filtering the oil. However, one of ordinary skill in the art would utilize varying sizes that are appropriate.

In this example, reservoir tank 100 (e.g., glycol reservoir) is configured to hold the glycol. Reservoir tank 100 is typically 50 gallons (200 Liters) in size and has an attached filter for filtering the glycol. However, one of ordinary skill in the art would utilize varying sizes that are appropriate.

In this example, hose 110 and hose 120 are configured to transfer the glycol. Each of hoses 110 and 120 can be of various lengths and may be connected to other hoses with, for example, quick connect couplers.

In one example, the heating process consists of collecting heat from four different components and transferring it to the glycol. For example, the four heat source components are the hydraulic heat generator 20, engine coolant heat exchanger 60, engine intercooler 90 and the exhaust heat exchanger 50. The sequence of glycol flow can be in any order, for example, mostly depending on ease of piping within the flameless heater.

In this example, the heating process begins by starting the prime mover 10. Once the prime mover 10 has warmed up, the prime mover 10 is throttled up to maximum power and rpm. At this time the hydraulic heat generator begins to generate heat and the heat is transferred to the oil, which is pumped from the reservoir 80, through the hydraulic pump 30, through the heat generator 20, and through the heat exchanger 70. It is at the heat exchanger 70, for example, that heat is transferred from the oil to the glycol.

Once the fluid has passed through the heat exchanger 70, it is returned to the reservoir 80, where it is stored and filtered until it is pumped back through the cycle. The oil is in a closed system that continually follows this route. This is one source of heat.

From the outlet of the centrifugal pump 40, the glycol is pumped to the oil/glycol heat exchanger 70. In this example, the glycol is then pumped to intercooler 90. The purpose of the intercooler 90, for example, is to cool the air coming from the compressor side of the turbocharger. As the air is compressed by the turbocharger it is heated. By passing through the intercooler 90, this air is cooled by the glycol. This results in the air being cooled as well as the glycol being heated at the same time. This is the second source of heat.

The glycol continues from the intercooler 90 to the engine coolant heat exchanger 60. The heat exchanger 60 allows the heat from the hot coolant to be transferred to the glycol. Sufficient volume of glycol is pumped to keep the engine operating within its specified temperature range. This is the third source of heat.

After exiting the engine heat exchanger 60, the glycol is pumped to the exhaust heat exchanger 50. In this exchanger 50, the hot exhaust from the engine which can be at 700 F (400 C) is allowed to flow across a series of pipes that the glycol flows through. This exchanger 60 is sized so that the exhaust output temperature is at approximately 70 F (20-25 C). From the outlet of this heat exchanger 60 the glycol is pumped to the water tank 130 where the heat from the hot glycol is transferred to the water. From there it is returned to the glycol reservoir 100 until it is pumped through the system 1 again.

Although an embodiment of the instant invention has been described above and illustrated in the accompanying drawing in order to be more clearly understood, the above description is made by way of example and not as a limitation to the scope of the instant invention. It is contemplated that various modifications apparent to one of ordinary skill in the art could be made without departing from the scope of the invention which is to be determined by the following claims.

We claim:

1. A flameless heater system, comprising: a first closed circulation path configured to circulate oil through said flameless heater system; a second closed circulation path configured to circulate glycol through said flameless heater system; a prime mover; a flameless heat generator arranged in the first closed circulation path and configured to heat the oil; a first heat exchanger arranged in both the first closed circulation path and the second closed circulation path, the first heat exchanger configured to transfer heat from the oil received from the heat generator in the first closed circulation path to the glycol in the second closed circulation path; an air to fluid second heat exchanger arranged in the second closed circulation path downstream of the first heat exchanger, the air to fluid second heat exchanger configured to transfer heat generated by operation of the prime mover to the glycol; an oil reservoir arranged in the first closed circulation path; and a glycol reservoir arranged in the second closed circulation path downstream from the second heat exchanger, wherein the air to fluid second heat exchanger is an intercooler configured to transfer heat generated in a turbocharger compressor of the mover to the glycol.

2. The flameless heater system of claim 1, further comprising a third heat exchanger arranged downstream of the intercooler in the second closed circulation path, wherein the third heat exchanger is configured to transfer heat from engine coolant circulating in the prime mover to the glycol.

3. The flameless heater system of claim 2, further comprising a fourth heat exchanger arranged downstream of the third heat exchanger in the second closed circulation path, wherein the fourth heat exchanger is configured to transfer heat from exhaust gas of the prime mover to the glycol.

4. The flameless heater system of claim 3, wherein the fourth heat exchanger is an air to fluid heat exchanger that comprises a series of pipes configured to transfer the glycol through the second closed circulation path, and the exhaust gas of the prime mover is configured to flow across the series of pipes to thereby increase the temperature of the glycol and decrease a temperature of the exhaust output emitted from said flameless fluid heater system.

5. The flameless heater system of claim 3, further comprising a fifth heat exchanger arranged downstream of the fourth heat exchanger in the second closed circulation path, wherein the fifth heat exchanger is configured to transfer heat from the glycol to a further material.

6. The flameless heater system of claim 5, wherein the further material is water.

7. The flameless heater system of claim 1, wherein the heat generator is a shear heat generator.

8. A method for flamelessly heating glycol a heated fluid inside a flameless heater system, the method comprising: moving oil through a first closed circulation path; moving glycol a heated fluid through a second closed circulation path, driving a heat generator by a prime mover, the heat generator arranged in the first closed circulation path and heating the oil; a first heat exchanger arranged in both the first closed circulation path and the second closed circulation path, the first heat exchanger transferring heat from the oil received from the heat generator in the first closed circulation path to the glycol in the second closed circulation path, wherein the heat generator is flameless; an air to fluid second heat exchanger arranged in the second closed circulation path downstream of the first heat exchanger, the air to fluid second heat exchanger transferring heat generated by operation of the prime mover to the glycol; and a glycol reservoir arranged in the second closed circulation path downstream from the air to fluid second heat exchanger, the glycol reservoir configured to hold glycol in the second closed circulation path, wherein the air to fluid second heat exchanger is an intercooler transferring heat generated in a turbocharger compressor of the prime mover to the glycol.

9. The method of claim 8, further comprising a third heat exchanger arranged downstream of the intercooler in the closed circulation path, wherein the third heat exchanger transfers heat from engine coolant circulating in the prime mover to the glycol.

10. The method of claim 9, further comprising a fourth heat exchanger arranged downstream of the third heat exchanger in the second closed circulation path, wherein the fourth heat exchanger transfers heat from exhaust gas of the prime mover to the glycol.

11. The method of claim 10, further comprising a fifth heat exchanger arranged downstream of the fourth heat exchanger in the second closed circulation path, wherein the fifth heat exchanger transfers heat from the glycol to a further material.

12. The method of claim 11, wherein the further material is water.

13. The method of claim 10, wherein
the fourth heat exchanger is an air to fluid heat exchanger that comprises a series of pipes,
the glycol flows inside of the series of pipes and is heated by the exhaust gas of the prime mover that flows across an outside surface of the series of pipes, and
the air to fluid heat exchanger increases a temperature of the glycol inside of the pipes and decreases a temperature of the exhaust output emitted from said flameless heater system.

14. The flameless heater system of claim 4, wherein the series of pipes are arranged and sized such that the temperature of the exhaust output emitted from said flameless fluid heater system is 20-25 degrees Celsius.

15. The method of claim 13, wherein the series of pipes are arranged and sized such that the temperature of the exhaust output emitted from said flameless fluid heater system is 20-25 degrees Celsius.

16. The flameless heater system of claim 1, further comprising a torsional vibration damper positioned between the prime mover and the heat generator.

* * * * *